(12) United States Patent
Christ

(10) Patent No.: US 10,260,678 B2
(45) Date of Patent: Apr. 16, 2019

(54) PRESSURE VESSEL HAVING WET-WRAPPED CARBON-FIBER-REINFORCED PLASTIC

(71) Applicant: Bayerische Motoren Werke Aktiengesellschaft, Munich (DE)

(72) Inventor: Timo Christ, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/237,675

(22) Filed: Aug. 16, 2016

(65) Prior Publication Data

US 2016/0356419 A1 Dec. 8, 2016

Related U.S. Application Data

(63) Continuation of application No. PCT/EP2015/055413, filed on Mar. 16, 2015.

(30) Foreign Application Priority Data

May 12, 2014 (DE) .................. 10 2014 208 830

(51) Int. Cl.
*F17C 1/06* (2006.01)
*B29C 70/32* (2006.01)
(Continued)

(52) U.S. Cl.
CPC .............. *F17C 1/06* (2013.01); *B29C 70/088* (2013.01); *B29C 70/32* (2013.01); *B29C 53/56* (2013.01); *B29C 53/822* (2013.01); *B29K 2705/02* (2013.01); *B29L 2031/7156* (2013.01); *F17C 2201/0104* (2013.01); *F17C 2201/0109* (2013.01); *F17C 2201/056* (2013.01); *F17C 2203/0604* (2013.01); *F17C 2203/0619* (2013.01); *F17C 2203/0646* (2013.01); *F17C 2203/0663* (2013.01);
(Continued)

(58) Field of Classification Search
CPC .................................................. B29C 70/086
See application file for complete search history.

(56) References Cited

U.S. PATENT DOCUMENTS

| 3,843,010 A | 10/1974 | Morse et al. | |
| 2009/0314088 A1* | 12/2009 | Djordjevic | G01N 29/028 73/602 |
| 2010/0139483 A1* | 6/2010 | Hefner | B01D 19/0036 95/30 |

FOREIGN PATENT DOCUMENTS

| CN | 103527920 A | 1/2014 |
| DE | 31 03 646 C2 | 3/1984 |

(Continued)

OTHER PUBLICATIONS

Chinese-language Office Action issued in counterpart Chinese Application No. 201580005817.0 dated Apr. 1, 2017 with English translation (11 pages).

(Continued)

*Primary Examiner* — Joel G Horning
(74) *Attorney, Agent, or Firm* — Crowell & Moring LLP

(57) ABSTRACT

A method is provided for producing a pressure vessel from a metal liner, which is reinforced at an outer lateral surface thereof by fiber composite material having a resin matrix. In at least one production step, the resin matrix of the fiber composite material is subjected to an ultrasound treatment.

14 Claims, 1 Drawing Sheet

(51) Int. Cl.
  *B29C 70/08* (2006.01)
  *B29L 31/00* (2006.01)
  *B29K 705/02* (2006.01)
  *B29C 53/56* (2006.01)
  *B29C 53/82* (2006.01)

(52) U.S. Cl.
  CPC .............. *F17C 2205/0323* (2013.01); *F17C 2205/0397* (2013.01); *F17C 2209/22* (2013.01); *F17C 2209/232* (2013.01); *F17C 2221/012* (2013.01); *F17C 2223/0123* (2013.01); *F17C 2223/036* (2013.01); *F17C 2260/011* (2013.01); *F17C 2270/0168* (2013.01); *Y02E 60/321* (2013.01)

(56) References Cited

FOREIGN PATENT DOCUMENTS

| | | |
|---|---|---|
| DE | 38 21 852 A1 | 2/1990 |
| DE | 101 56 377 A1 | 6/2003 |
| DE | 10 2006 051 376 A1 | 5/2008 |
| DE | 10 2011 007 361 A1 | 10/2012 |
| JP | 61-19311 A | 1/1986 |
| JP | 4-101831 A | 4/1992 |
| JP | 2010-125825 A | 6/2010 |
| JP | 2011-236926 A | 11/2011 |
| JP | 2011236926 A * | 11/2011 ............ B29C 70/32 |
| JP | 2013-163305 A | 8/2013 |
| JP | 5369650 B2 | 12/2013 |

OTHER PUBLICATIONS

Chinese-language Office Action issued in counterpart Chinese Application No. 201560005817.0 dated Aug. 15, 2017 with English translation (9 pages).
German-language Search Report issued in counterpart German Application No. 10 2014 208 830.5 dated Feb. 13, 2015 with partial English translation (15 pages).
International Search Report (PCT/ISA/210) issued in PCT Application No. PCT/EP2015/055413 dated Jun. 8, 2015 with English translation (5 pages).
German-language Written Opinion (PCT/ISA/237) issued in PCT Application No. PCT/EP2015/055413 dated Jun. 8, 2015 (4 pages).
Chinese-language Office Action issued in counterpart Chinese Application No. 201580005817.0 dated Feb. 8, 2018 with English Translation (eight (8) pages).
Chinese-language Office Action issued in counterpart Chinese Application No. 201580005817.0 dated Jul. 4, 2018 with English translation (nine (9) pages).

* cited by examiner

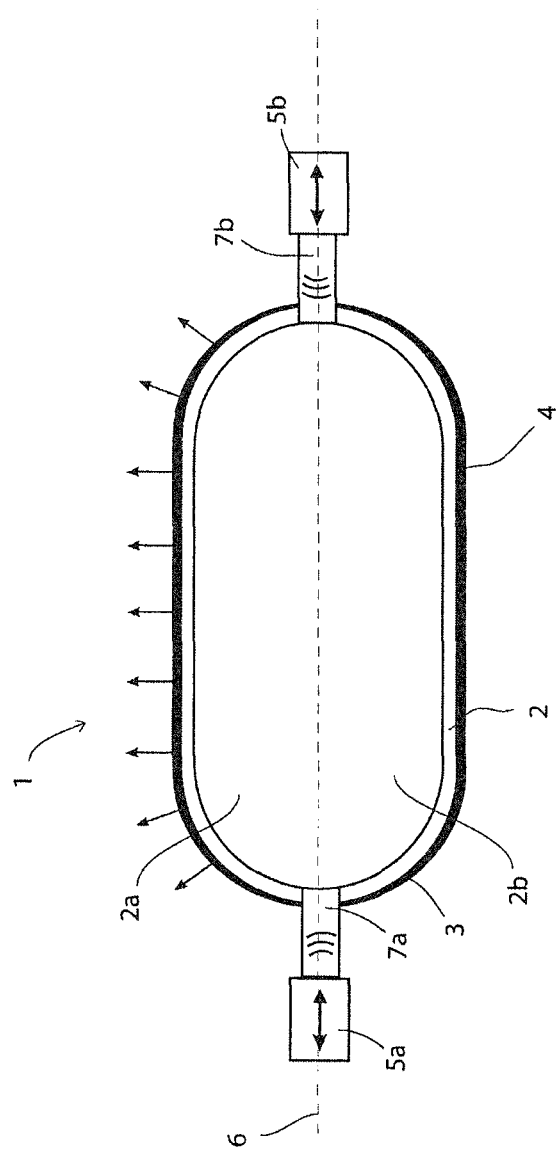

PRESSURE VESSEL HAVING WET-WRAPPED CARBON-FIBER-REINFORCED PLASTIC

CROSS REFERENCE TO RELATED APPLICATIONS

This application is a continuation of PCT International Application No. PCT/EP2015/055413, filed Mar. 16, 2015, which claims priority under 35 U.S.C. § 119 from German Patent Application No. 10 2014 208 830.5, filed May 12, 2014, the entire disclosures of which are herein expressly incorporated by reference.

BACKGROUND AND SUMMARY OF THE INVENTION

The invention relates to a method for producing a pressure vessel from a metal liner. The invention furthermore relates to a method for producing a hydrogen pressure vessel, in particular for a motor vehicle.

Modern drive systems for motor vehicles may be based on the use of gaseous hydrogen as a source of energy. For this purpose, the hydrogen is installed and carried in the motor vehicle in a "hydrogen tank" at up to 700 times excess pressure. Hydrogen tanks of this kind are typically in the form of steel cylinders that have been used at up to 200 times excess pressure. To achieve a higher filling pressure, the wall of the hydrogen tank can additionally be composed of a fiber composite material containing glass and/or carbon fibers, for example.

To enable such gas tanks to be filled, they typically have a filler stub for feeding in and discharging the hydrogen, or for supplying a drive system with the hydrogen required.

DE 000010156377 A1, for example, discloses a gas pressure vessel which consists of a composite structure comprising a cylindrical metal container (liner) and a pre-produced jacketing tube, in particular a laminate tube. To produce the composite gas pressure vessel, a cylindrical metal container is introduced into the pre-produced jacketing tube and is deformed and expanded by means of gas pressure to such an extent that a nonpositive and permanent connection is formed between the metal container and the jacketing tube. The liner is composed of an aluminum alloy and the jacketing tube is composed of a carbon fiber laminate, for example.

One aim, particularly in the automotive industry, is that of reducing the weight of all the components and therefore also that of the onboard pressure tanks. To reduce the weight of gas pressure cylinders, composite gas cylinders (composite cylinders) are used, for example. Composite gas cylinders consist of a "liner", which is wound over a significant part of its length with composite fibers composed of glass, carbon, aramid or wire by use of a special winding technique. For example, in the predominantly practiced wet-winding method, a fiber/resin laminate is applied to the liner in a controlled winding process and is then given its final usage properties in a downstream heat treatment process. Composite gas cylinders and the production thereof are described in DE 31 03 646 C2, DE 38 21 852 A1 and U.S. Pat. No. 3,843,010, for example. DE 10 2006 051 376 A1 discloses a further pressure vessel. This is prepared from a metallic material in a rolling process. To increase its strength or to obtain a thinner metallic wall in order to reduce weight, the metallic outer surface of the vessel was likewise wound with fiber-reinforced plastic.

Further improvements have been achieved by way of autofrettage. The term "autofrettage" is used to denote a method for increasing the service life of metal hollow bodies, especially fiber-reinforced metal hollow bodies, for use at high internal pressures. During this process, the metal hollow body is subjected to an internal pressure greater than the subsequent operating pressure, resulting in the metallic liner becoming plastic. After release of the pressure, internal compressive stresses arise in this region, preventing cracking in subsequent use and thus increasing fatigue strength right up to the endurance limit. An example of this kind is likewise found in the publication DE 102011007361 A1.

In the case of the wet-winding processes described above for jacketing the liner with a layer of fibers, the disadvantage is that there is an unwanted introduction of air into the resin system in the various process steps. The enclosed air bubbles lead to increased porosity and hence to lower fiber volume density. The results are, on the one hand, poorer adhesion of the fiber matrix to the liner and, on the other hand, problems with strength.

It is accordingly the object of the present invention to overcome the disadvantages stated above and to provide a pressure vessel which has a jacket consisting of fiber material with a high fiber volume density, optimize adhesion of the fiber matrix and improve stiffness, thereby enabling the wall thickness and hence overall weight of the pressure vessel to be reduced.

This and other objects are achieved by a method for producing a pressure vessel from a metal liner, which is reinforced at an outer lateral surface thereof by fiber composite material having a resin matrix, wherein, in at least one production step, the resin matrix of the fiber composite material is subjected to an ultrasound treatment.

The basic concept of the present invention is to increase the degassing rate of the air or air bubbles enclosed in the resin system during the production process, preferably during the process of winding the fiber composite material onto the outer jacket of the liner. This is done by an ultrasound treatment in order thereby to reduce the quantity of residual gas in the resin system. This leads to lower porosity of the fiber composite material and to increased stiffness.

Thus, according to the invention, a method is proposed for producing a pressure vessel consisting of a metal liner, which is reinforced at an outer lateral surface thereof by a fiber composite material having a resin matrix, preferably a CFRP fiber composite material, wherein, in at least one production step, the resin matrix of the fiber composite material is subjected to an ultrasound treatment.

In an advantageous embodiment of the invention, the characteristic of the ultrasound waves during the ultrasound treatment is chosen so that a maximized degassing rate of the enclosed air or air bubbles from the resin matrix is achieved. For this purpose, the intensity and wavelength of the ultrasound waves can be matched to the geometry of the liner and the properties of the material. As compared with a method that does not employ ultrasound treatment, the degassing rate and residual gas density can be determined by suitable analytical methods. A similarly suitable measure of demonstrating successful degassing is porosity determination, which can involve destructive or nondestructive measurement. By way of the ultrasound treatment measures according to the invention, porosity can be reduced to a value of about 0.05 to 0.75 (about 5% to 75%) compared with an untreated resin matrix.

In a preferred embodiment of the method according to the invention, the fiber composite material is applied to the outer lateral surface of the liner by a winding method, preferably a wet-winding method.

It is advantageous if the ultrasound treatment is carried out during the winding process. As a supplementary measure, the liquid resin bath or the impregnated resin matrix can be treated with ultrasound waves before the winding process.

In another advantageous embodiment of the method, an ultrasound treatment of the resin of the resin matrix can take place (continue) even during the curing process of the resin, preferably in a vacuum chamber. Through the use of a vacuum during winding and/or during curing, degassing is further promoted, allowing low residual gas densities to be achieved.

During the ultrasound treatment, the ultrasound waves are advantageously input during the ultrasound treatment by at least one ultrasound probe coupled mechanically or acoustically to the metallic liner. It is also possible, for example, to use two ultrasound probes, wherein the ultrasound probes are coupled respectively to an inlet stub and an outlet stub of the liner of the pressure vessel.

In a preferred embodiment of the method, the liner is rotated about its axis, preferably about the center line of a rotationally symmetrical pressure vessel, to enable the liner to be wound with the fiber composite material. It is particularly advantageous here if the ultrasound waves are input in such a way that the increase in the degassing rate due to ultrasonic excitation takes place only in that region of the upper half shell which is at the top during the rotation of the liner. This avoids a situation where gas which emerges on the underside cannot escape upward, which would counteract the desired effect. This can be accomplished through a suitable choice of ultrasound sensors and the appropriate coupling thereof to the liner so that only the upper half shell is subject to the desired ultrasound resonance.

A particularly advantageous embodiment consists in the combination of an aluminum liner with fibers of CFRP. However, another advantageous possibility in the case of different metallic materials of the liner is for the fiber composite material to consist of carbon fibers and/or glass fibers.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic section through a pressure vessel having two ultrasound probes installed for inputting ultrasound waves according to an embodiment of the invention.

DETAILED DESCRIPTION OF THE DRAWINGS

The method step of ultrasound treatment of a pressure vessel 1 having two installed ultrasound probes 5a, 5b for inputting ultrasound waves is shown schematically in FIG. 1. The illustrative embodiment shows a pressure vessel 1 consisting of an aluminum liner 2, which has been reinforced at its outer lateral surface 3 by way of a winding method with a fiber composite material 4 containing a resin matrix.

The method is carried out in such a way that the liner 2 rotates about its axis 6 to enable it to be wound with the fiber composite material. As a result, one half 2a (upper half shell) is always above the horizontal section plane formed by the axis 6, and the other half 2b (lower half shell) is always below the section plane. Attention is drawn to the fact that the term "half shell" does not mean that the liner has been assembled from 2 halves but merely denotes the region which is either above or below the section plane.

In the winding production step, the resin matrix of the fiber composite material 4 is subjected to an ultrasound treatment, namely by coupling the two ultrasound probes 5a, 5b, which are mounted on the inlet stub 7a and on the outlet stub 7b of the liner 2 of the pressure vessel 1.

The characteristic of the ultrasound waves during the ultrasound treatment is chosen so that, on the one hand, an increased degassing rate of enclosed air or air bubbles from the resin matrix is achieved and, on the other hand, degassing is excited predominantly in the region of the upper half shell. In other words, this means that the inputting of the ultrasound waves is performed in such a way that the increase in the degassing rate through ultrasound excitation takes place predominantly or exclusively in the region which is, in each case, at the top during the rotation of the liner 2, i.e. in the region of the upper half shell 2a.

Nevertheless, it is also possible for excitation and hence degassing to be performed over the entire outer lateral surface and for a corresponding ultrasound excitation to be employed.

In a further method step after the conclusion of the winding process and the application of the fiber composite material 4, curing takes place in a vacuum furnace. During curing, an ultrasound treatment of the resin of the resin matrix is likewise carried out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a pressure vessel, the method comprising the acts of:
   reinforcing a metal liner at an outer lateral surface thereof via fiber composite material having a resin matrix;
   rotating the metal liner about a rotation axis of the pressure vessel to enable the metal liner to be wound with the fiber composite material via a winding method; and
   in at least one production step, degassing air or air bubbles from the resin matrix by subjecting the resin matrix of the fiber composite material to an ultrasound treatment, wherein
   the ultrasound waves are input in such a way that an increased degassing rate due to ultrasonic excitation occurs only in a region of an upper half shell of the metal liner that is above an imaginary horizontal sectional plane containing the rotation axis of the pressure vessel during rotation of the metal liner.

2. The method according to claim 1, wherein one or more characteristics of ultrasound waves used during the ultrasound treatment are chosen to provide an increased degassing rate of enclosed air or air bubbles from the resin matrix compared to when no ultrasound treatment is applied.

3. The method according to claim 2, wherein the ultrasound waves are input during the ultrasound treatment via one or more ultrasound probes coupled mechanically or acoustically to the metal liner.

4. The method according to claim 3, wherein the one or more ultrasound probes are coupled to a respective inlet stub or outlet stub of the metal liner of the pressure vessel.

5. The method according to claim 1, wherein the act of reinforcing the metal liner is carried out by applying the fiber composite material to the outer lateral surface of the metal liner via the winding method.

6. The method according to claim 5, wherein the ultrasound treatment is carried out during the winding method.

7. The method according to claim 5, wherein ultrasound waves are input during the ultrasound treatment via one or more ultrasound probes coupled mechanically or acoustically to the metal liner.

8. The method according to claim 7, wherein the one or more ultrasound probes are coupled to a respective inlet stub or outlet stub of the metal liner of the pressure vessel.

9. The method according to claim 1, wherein the ultrasound treatment of the resin matrix occurs before applying the fiber composite material to the outer lateral surface of the metal liner.

10. The method according to claim 1, wherein the ultrasound treatment of the resin matrix occurs during a curing process.

11. The method according to claim 10, wherein the ultrasound treatment during the curing process occurs in a vacuum chamber.

12. The method according to claim 1, wherein the fiber composite material is composed of carbon and/or glass fibers.

13. A method of producing a pressure vessel, the method comprising the acts of:
reinforcing a metal liner at an outer lateral surface thereof by winding fiber composite material having a resin matrix onto the outer lateral surface of the metal liner;
rotating the metal liner about a rotation axis of the pressure vessel to enable the metal liner to be wound with the fiber composite material; and
degassing air or air bubbles from the resin matrix by subjecting the resin matrix of the fiber composite material to an ultrasound treatment while winding the fiber composite onto the outer lateral surface of the metal liner, wherein
ultrasound waves are input in such a way that an increased degassing rate due to ultrasonic excitation occurs only in a region of an upper half shell of the metal liner that is above an imaginary horizontal sectional plane containing the rotation axis of the pressure vessel during rotation of the metal liner.

14. The method according to claim 13, wherein an intensity and a wavelength of the ultrasound waves are determined based on a geometry of the metal liner and a property of the fiber composite material.

* * * * *